(12) United States Patent
Masa

(10) Patent No.: US 8,823,952 B2
(45) Date of Patent: Sep. 2, 2014

(54) MEASUREMENT SYSTEM FOR OPTICAL TOUCH TRIGGER OR SCANNING PROBE WITH A CONCAVE MIRROR

(71) Applicant: CSEM Centre Suisse d'Electronique et de Microtechnique SA, Neuchatel (CH)

(72) Inventor: Peter Masa, Onnens (CH)

(73) Assignee: CSEM Centre Suisse d'Electronique et de Microtechnique SA—Recherche et Developpement, Neuchatel (CH)

( * ) Notice: Subject to any disclaimer, the term of this patent is extended or adjusted under 35 U.S.C. 154(b) by 0 days.

(21) Appl. No.: 13/738,176

(22) Filed: Jan. 10, 2013

(65) Prior Publication Data

US 2013/0182242 A1        Jul. 18, 2013

(30) Foreign Application Priority Data

Jan. 13, 2012    (EP) .................................... 12151174

(51) Int. Cl.
    *G01B 11/14*        (2006.01)
(52) U.S. Cl.
    USPC .......................................... 356/614; 356/616
(58) Field of Classification Search
    USPC ......... 356/614–623, 3.01–3.06, 3.1, 3.16, 16, 356/17, 23–25, 138–140
    See application file for complete search history.

(56) References Cited

U.S. PATENT DOCUMENTS

| 5,333,388 A | 8/1994 | Butler et al. |
| 5,563,408 A | 10/1996 | Matsumoto et al. |

FOREIGN PATENT DOCUMENTS

| EP | 0 195 130 | 9/1986 |
| EP | 0 390 648 | 10/1990 |
| EP | 2 169 357 | 3/2010 |
| GB | 2 220 748 | 1/1990 |
| WO | 2006/107363 | 10/2006 |
| WO | 2008/105021 | 9/2008 |

OTHER PUBLICATIONS

European Search Report dated May 22, 2012, corresponding to the Foreign Priority Application No. EP 12 15 1174.

*Primary Examiner* — Tri T Ton
(74) *Attorney, Agent, or Firm* — Young & Thompson

(57) ABSTRACT

Method for determining the position and/or displacement of a mobile element with respect to a fixed frame, includes using a fixed light source emitting a light beam, arranging the source with respect to the mobile element and a sensor to induce an interaction between the beam and sensor, using a concave mirror, integral in movement with the mobile element, for reflecting the beam in direction to the sensor, arranging on the path of the beam a fixed optical mask which presents a two dimensional regular pattern interlaced with an absolute code, detecting and processing the image casted by the mask on the sensor, computing the displacement value of the image on the sensor and using the computed displacement value for computing and providing the position and/or the displacement in at least one direction of the mobile element in dependence of the image's displacement.

21 Claims, 2 Drawing Sheets

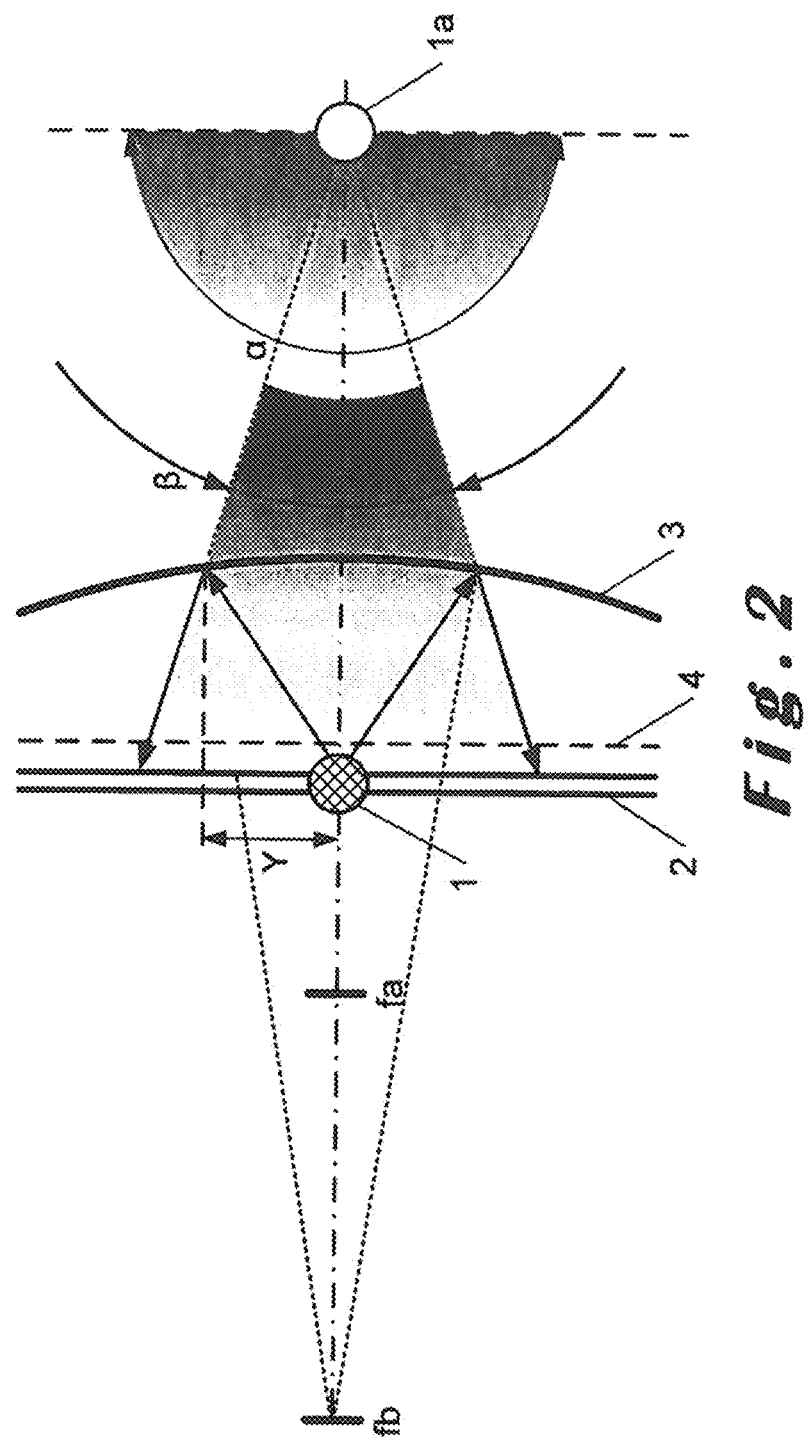

MEASUREMENT SYSTEM FOR OPTICAL TOUCH TRIGGER OR SCANNING PROBE WITH A CONCAVE MIRROR

FIELD OF THE INVENTION

The present invention relates to the field of absolute positioning devices or systems, in particular to the field of three or more degrees of freedom measurement systems such as multi-dimensional position encoders. Examples of such devices are pointing devices for computers, measuring devices for tooling, trigger stylus, touch trigger probes or scanning probes.

Particularly, the present invention relates to the field of absolute positioning devices where the measured position ranges from a few nanometers to a few meters. It relates to positioning devices associated to measurement systems that measure with a very high accuracy the position and/or the displacement of a mobile element in space.

The invention concerns in particular measurement systems which are able to detect displacements in a very small volume.

BACKGROUND OF THE INVENTION

Positioning devices are well known in the art, and are used across several technical domains. In the metrology domain, positioning devices are mostly found as rotary encoders, as in WO 2006107363 A1, or linear encoders as in U.S. Pat. No. 5,563,408. These encoders output one dimensional information about the position, and are operating with a resolution of the order of 1/10 of a micron or of a 1/10,000 of a degree. To reach a positioning with several degrees of freedom, these encoders can be part of a chain, for example in a robotic arm, with the disadvantage that the more encoders are used, the more the positioning resolution degrades. The state of the art of robotic arm positioning system has today a resolution, which reaches at best one micron.

In a different technical field, the document EP 0 390 648 A1 discloses a multidirectional contact sensor which comprises a mobile probe. The mobile probe is mounted on a rigid frame with the help of a flexible membrane. The rear part of the probe comprises a concave mirror which faces an optoelectronic system comprising optic fibres for detecting a movement of the probe. The concave mirror reflects a light beam emitted by the optoelectronic system toward a sensor which detects the intensity of the reflected light beam. The detected intensity depends on the orientation of the reflected light beam and though of the position of the probe. The reaching of different intensity levels is then used for the control of functions which depend on the position of the probe. Such a multidirectional contact sensor doesn't fit in a very small volume. Additionally, the accuracy of the detected positions lies between 0.2 and 0.4 microns which is not satisfactory for very small systems. Intensity fluctuations may also occur due to fluctuation in power supply, temperature variation, ageing of the light source, changes of mirror reflectivity, which impose limits in the stability and accuracy of the sensor.

SUMMARY OF THE INVENTION

An object of the present invention is to alleviate the limitation of the prior art by providing a novel measurement system and a novel measurement method which allow a very fast and reliable detection and measurement of nanometric displacements, for instance three dimensional displacements.

Another object of the invention is to propose a novel measurement system and a novel measurement method which allow the detection and measurement in a very small volume, for instance less than 1 cm$^3$, with a limited power and a low thermal dissipation, for instance less than 100 mW.

Another object of the invention is to propose a novel measurement system and a measurement method which enhance the resolution, the speed and the precision of optical position encoders.

The objects given to the invention are achieved with the help of a measurement method for determining the position and/or the displacement of a mobile element with respect to a fixed frame, wherein one uses fixed light source emitting a light beam, one arranges the light source with respect to the mobile element and with respect to a sensor in a way so as to induce an interaction between the light beam and the sensor which depends on the position of the mobile element and one uses processing and computing means for providing a value of the position and/or the displacement of the mobile element in dependence of the output signal of the sensor. According to the invention, the method comprises the steps of:

using a concave mirror, fixed to the mobile element, for reflecting the light beam in direction to the sensor, arranging on the path of the light beam a fixed optical mask which comprises a two dimensional regular pattern, detecting and processing the image casted by the optical mask on the sensor, computing the displacement value of said image on said sensor, and using the computed displacement value for computing and providing the position and/or the displacement in at least one direction of the mobile element in dependence of the image's displacement.

The displacement value of said image on the sensor is proportional to the displacement of the virtual position of the light source.

In an implementation in accordance with the invention, the method comprises a step of determining displacements in at least one direction extending in plane which is parallel to the plane of the sensor.

In an implementation in accordance with the invention, the method consists in using the shadow of the optical mask casted on the sensor, as the displacing image.

In an implementation in accordance with the invention, the displacement of the mobile element is given by:

$$\Delta z_{led} = C \times \Delta z_{mirror}$$

where C is a multiplying value, $\Delta z_{mirror}$ is the displacement of the concave mirror in the z direction and $\Delta z_{led}$ is the displacement of the virtual position of the light source in the z direction which corresponds to the displacement of the image casted on the sensor.

In an implementation in accordance with the invention, the method consists in determining the multiplying value C by using an empirical method.

In an implementation in accordance with the invention, the method comprises the step of determining displacements in the z direction which extends orthogonally to the plane of the sensor.

The objects given to the invention are achieved with the help of a measurement system for determining the position and/or the displacement of a mobile element with respect to a fixed frame, comprising a fixed light source emitting a light beam, a concave mirror fixed to the mobile element and arranged to reflect the emitted light beam toward a fixed sensor, a fixed optical mask arranged on the path of the light beam for influencing said light beam in dependence of the position of the mobile element and processing and computing means fed with the output signal of the sensor, for providing the position and/or the displacement of the mobile element, characterized in that the optical mask comprises a two dimensional regular pattern designed to cast an image or a shadow of said optical mask on the sensor, the processing and computing means being designed to determine the displacement and/or the position of the mobile element from the detected displacement of the image casted on the sensor.

In an embodiment in accordance with the invention, the optical mask comprises a distinctive element in the regular pattern.

In an embodiment in accordance with the invention, the regular pattern comprises an absolute code interlaced with the regular pattern.

In an embodiment in accordance with the invention, the sensor is an imaging device comprising a pixel array.

In an embodiment in accordance with the invention, the imaging device comprises a plurality of pixels arranged in two dimensions and in that the processing and computing means are designed to compute displacements of the image in two directions defining the imaging device.

In an embodiment in accordance with the invention, the light source is a punctual light source of the LED kind.

In an embodiment in accordance with the invention, the concave mirror has a spherical or parabolic shape.

In an embodiment in accordance with the invention, the optical mask is a grating comprising transparent and opaque areas for shaping the two dimensional regular pattern and the absolute code.

In an embodiment in accordance with the invention, the transparent areas are made of perforations or holes.

In an embodiment in accordance with the invention, the mobile element is a trigger stylus, a touch trigger stylus, a force measurement system or an accelerometer.

An advantage of the method and of the system in accordance with the invention lies in the fact that it decreases the smallest detectable displacement by optical magnification.

The measurement system in accordance with the invention can detect displacements as low as 1 to 5 nanometers and this with computing time in the order of 1 microsecond.

Another advantage of the method and of the system in accordance with the invention lies in the fact that it decreases by a factor of 10 the number of photons needed for the detection of nanometric displacements. The current for the light source can so be reduced. This permits to achieve a reduction of the power consumption and of the heat dissipation of the measurement system. The reduced heat dissipation increases the thermal stability, accuracy and reliability.

BRIEF DESCRIPTION OF THE DRAWINGS

The invention will be better understood by reading the following description, provided in reference to the annexed drawings where:

FIG. 2, illustrates an advantage obtained with the measurement system of FIG. 1.

DETAILED DESCRIPTION OF A PREFERRED EMBODIMENT

Figure 1:
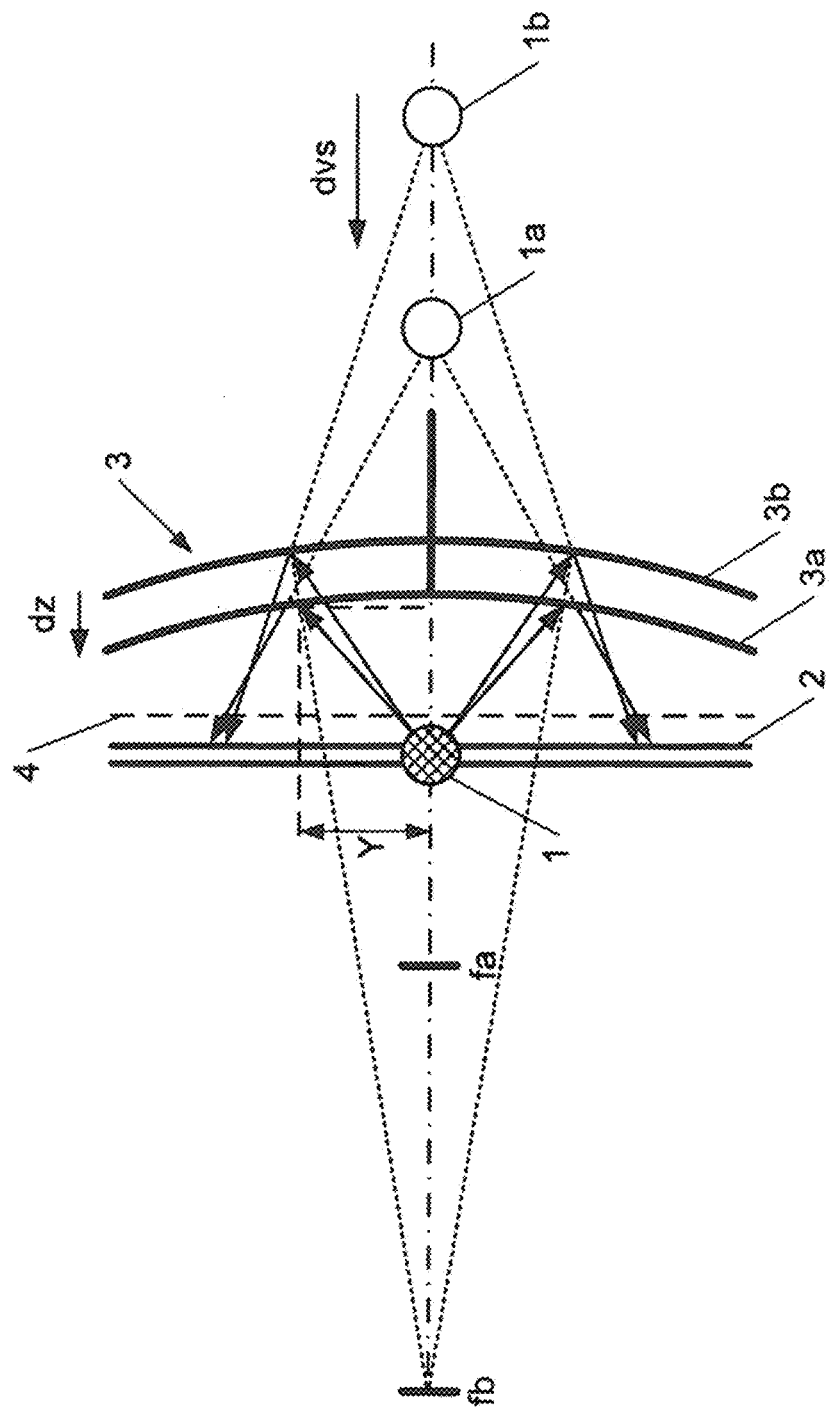
FIG. 1, shows the functional principle of an embodiment of the measurement system in accordance with the invention.

Elements that are structurally and functionally identical, and that are present in more than one distinct figure or illustration, are given the same numeric or alphanumeric reference in each of them.

In the following description, we will first present the measurement system, as illustrated in FIG. 1, which comprises a single point light source 1, a sensor 2, a concave mirror 3 and an optical mask 4 arranged to cast an image and a shadow of said optical mask 4, on the sensor 2.

The sensor 2 is a two dimensional imaging device comprising a pixel array associated to processing and computing means. The pixel array is preferably constituted of an assembly of photodiodes. The imaging device comprises a plurality of pixels arranged in two dimensions and the processing and computing means are designed to compute displacements of the image or shadow, casted on the imaging device, at least in two directions.

The optical mask 4, is a fixed grating which comprises a two dimensional regular pattern designed to cast an image and a shadow of said optical mask 4 on the sensor 2. To handle a positioning measure, which can vary more than the distance between two neighboring elements forming the regular pattern, a distinctive element can be added to the regular pattern. The distinctive element can be a missing element of the regular pattern, or a missing row and column of the regular pattern. The distinctive element can also be embodied by the end, i.e. the border, of the regular pattern, provided that the border is visible on the sensor.

In another embodiment in accordance with the invention, in particular for larger displacements of the mobile element, the optical mask 4 comprises an absolute code interlaced with the regular pattern.

The point light source 1 is an immobile light source emitting a light beam toward the concave mirror 3. The point light source 1 is preferably a punctual light source of the LED kind.

The concave mirror 3 presents a curvature preferably comprised within the range 5 to 20 mm. The concave mirror 3 has for instance a parabolic or spherical shape.

The concave mirror 3 is fixed to the mobile element and arranged to reflect the emitted light beam toward the fixed sensor 2. The fixed optical mask 4 is arranged on the path of the light beam for influencing said light beam in dependence of the position and/or the displacements of the mobile element.

The processing and computing means are designed to determine by using the detected displacement of the image or shadow casted on the sensor 2, the displacement and/or the position of the mobile element.

As an example, the optical mask 4 can be made with a chromium-plated glass. The light is blocked at the locations where chromium is deposited, and can go through the glass elsewhere. The preferred embodiment is the one using opaque regions and holes for implementing transparent regions. For example a grating made of nickel and holes may be used. Today Nickel plates can be manufactured at low cost, with thicknesses less than 50 microns, and with an accuracy of the holes of one micron over a couple centimeters. It is preferred to implement transparent regions by holes instead of by glass, because the light goes straight through the holes, while it is slightly deviated by a glass layer, according to Snell's law.

An example of an optical mask 4 or grating that uses a two-dimensional code as distinctive element, which is interlaced with the repetitive patterns, is described in EP 2 169 357 A1.

In another embodiment of the invention, the optical mask 4 can be implemented by using a microlens array. In other words, the component pattern is a microlens and the distinctive element is a missing microlens region. Each black dot represents the position of a micro-lens. The microlenses are more expensive to produce than a conventional grating, but generate a shadow pattern, which has more light, and thus allows for a faster measurement system. In addition, the diffraction phenomena, also known as Talbot effect, have a substantially smaller influence on the shadow pattern. This last advantage allows for more flexibility in the choice of the distance between the element and the imaging device.

In another embodiment of the invention, the point light source 1 is connected to the computing means and to the imaging device. By connected, we mean that there is at least one electrical connection between the computing means, the imaging device and the point light source 1. For example, the point light source 1 can be placed next to the imaging device on the same circuit, or even in the middle of the imaging device. This configuration requires only one power supply, and allows for a very convenient synchronisation between the image capture and the light emission.

The measurement system enables to carry out a measurement method as described below.

The measurement method, for determining the position and/or the displacement of a mobile element with respect to a fixed frame, consists in using the fixed point light source 1 emitting a light beam and in arranging the point light source 1 with respect to the mobile element and with respect to the sensor 2 in a way so as to induce an interaction between the light beam and the sensor 2 which depends on the position of the mobile element.

The measurement method aims to use the processing and computing means for providing the value of the position and/or the displacement of the mobile element in dependence of the output signal of the sensor 2.

In a step a), the measurement method consists in using the concave mirror 3 which is integral in movement with the mobile element, for reflecting the light beam in direction to the sensor 2.

In a step b), the measurement method consists in arranging on the path of the light beam the fixed optical mask 4 which presents a two dimensional regular pattern interlaced with an absolute code.

In a step c), the measurement method consists in detecting and processing the image casted by the optical mask 4, on the sensor 2.

In a step d), the measurement method consists in computing the displacement value of said image or shadow on said sensor 2.

In a step e), the measurement method consists in using the computed displacement value for computing and providing the position and/or the displacement in at least one direction of the mobile element in dependence of the image's or of the shadow's displacement.

In an implementation in accordance with the invention, the measurement method consists in using the shadow of the optical mask 4 casted on the sensor 2, as the displacing image.

When assuming of small angles (R>>y) leading to corresponding geometrical approximations and that an origin is defined on the position of the light source 1, the virtual position of the light source is given by:

$$z_{led} = 2 \times z_m \times (R-z_m)/(R-2z_m)$$

where R is equal to 2f, f being the focal distance of the concave mirror 3, $z_m$ being the position of the concave mirror 3 and R>>y, y being the assumed position of the light ray on the concave mirror 3 with respect of his centre.

In an implementation in accordance with the invention in which the concave mirror 3 moves together with the mobile element in the orthogonal direction Z with respect to the sensor 2, the displacement of said mobile element is given by:

$$\Delta z_{led} = C \times \Delta z_{mirror}$$

where C is a multiplying value, $\Delta z_{mirror}$ is the displacement of the concave mirror 3 in the z direction and $\Delta z_{led}$ is the displacement of the virtual position of the light source 1 in the Z direction which is proportional to the displacement of the image casted on the sensor 2.

The multiplying value C may be a given constant value for a displacement of the concave mirror 3 between two given successive positions. In some applications, C remains quasi-constant in a small range of angles and mirror positions. For example for touch trigger probes the displacements of the moving part are in the order of micrometers and C can be considered constant.

In another implementation in accordance with the invention, the measurement method consists in determining displacements in at least one additional direction, extending in plane which is parallel to the plane of the sensor 2.

FIG. 1 illustrates an implementation of the method in accordance with the invention. The displacement dz of the concave mirror 3, from the position 3b to the position 3a induces the displacement dvs of the virtual positions of the point light source 1, from position 1b to position 1a.

It appears that this displacement dvs, which is detected on the imaging device and which is more important than the real displacement of the mobile element or the concave mirror 3, enhances the resolution of the measurement system. The measurement system in accordance with the invention enables to amplify the detected displacements and at the same time it improves its efficiency by concentrating the light on the sensor 2 as it is illustrated in FIG. 2.

The concave mirror 3 concentrates the light of the point light source 1 (LED) to the sensor 2, resulting in a decrease of the needed amount of photons generated by the LED for the detection by roughly a factor 10. Without the concave mirror 3, the virtual point light source 1a would emit the light in the virtual solid angle α while the use of the concave mirror 3 reduces the solid angle to β. The optical efficiency is therefore increased.

This description has been provided only for purpose of non limiting example. Those skilled in the art may adapt the invention but keeping within the scope of the invention as defined in the claims. Naturally, it is possible to envisage replacing any of the means described or any of the steps described, with equivalent means or an equivalent step without going beyond the scope of the present invention.

What is claimed is:

1. A measurement method for determining at least one of the group consisting of position and displacement of a mobile element with respect to a fixed frame, wherein a fixed light source (1) emitting a light beam is used, the light source (1) is arranged with respect to the mobile element and with respect to a sensor (2) in a way so as to induce an interaction between the light beam and the sensor (2) which depends on the position of the mobile element and wherein processing and computing means are used for providing a value of the at least one of the group consisting of the position and the displacement of the mobile element in dependence of the output signal of the sensor (2), said measurement method comprising the steps of:
   a) using a concave mirror (3), fixed to the mobile element, for reflecting the light beam in direction to the sensor (2),
   b) arranging on the path of the light beam a fixed optical mask (4) which comprises a two dimensional regular pattern,
   c) detecting and processing a displacing image casted by the optical mask (4) on the sensor (2), d) computing the displacement value of said displacing image on said sensor (2), and e) using the computed displacement value for computing and providing the at least one of the group consisting of the position and the displacement in at least one direction of the mobile element in dependence of displacing image's displacement.

2. The method of claim 1, wherein the shadow of the optical mask (4) casted on the sensor (2) is used as the displacing image.

3. The method of claim 1, wherein the displacement of the mobile element is given by:

$$\Delta z_{led} = C \times \Delta z_{mirror}$$

where C is a multiplying value, $\Delta z_{mirror}$ is the displacement of the concave mirror (3) in the z direction and $\Delta z_{led}$ is the displacement of the virtual position of the light source (1) in the z direction which is proportional to the displacement of the image casted on the sensor (2).

4. The method of claim 3, consisting in determining the multiplying value C by using an empirical method.

5. The method of claim 2, wherein the displacement of the mobile element is given by:

$$\Delta z_{led} = C \times \Delta z_{mirror}$$

where C is a multiplying value, $\Delta z_{mirror}$ is the displacement of the concave mirror (3) in the z direction and $\Delta z_{led}$ is the displacement of the virtual position of the light source (1) in the z direction which is proportional to the displacement of the image casted on the sensor (2).

6. The method of claim 5, consisting in determining the multiplying value C by using an empirical method.

7. The method of claim 3, comprising the step of determining displacements in the z direction which extends orthogonally to the plane of the sensor (2).

8. The method of claim 5, comprising the step of determining displacements in the z direction which extends orthogonally to the plane of the sensor (2).

9. The method according to claim 3, comprising a step of determining displacements in at least one direction extending in plane which is parallel to the plane of the sensor (2).

10. A measurement system for determining at least one of the group consisting of the position and the displacement of a mobile element with respect to a fixed frame, said measurement system comprising a fixed light source (1) emitting a light beam, a concave mirror (3) fixed to the mobile element and arranged to reflect the emitted light beam toward a fixed sensor (2), a fixed optical mask (4) arranged on the path of the light beam for influencing said light beam in dependence of the position of the mobile element and processing and computing means receiving the output signal of the sensor (2), for providing the at least one of the group consisting of the position and the displacement of the mobile element, wherein the optical mask (4) comprises a two dimensional regular pattern designed to cast an image or a shadow of said optical mask (4) on the sensor (2), said processing and computing means being designed to determine that the at least one of the group consisting of the displacement and the position of the mobile element from the displacement of the image casted on the sensor (2) detected by the sensor.

11. The measurement system of claim 10, wherein the optical mask comprises a distinctive element in the two dimensional regular pattern.

12. The measurement system of claim 10, where the regular pattern comprises an absolute code interlaced with the two dimensional regular pattern.

13. The measurement system of claim 10, wherein the sensor (2) is an imaging device comprising a pixel array.

14. The measurement system of claim 11, wherein the sensor (2) is an imaging device comprising a pixel array.

15. The measurement system of claim 12, wherein the sensor (2) is an imaging device comprising a pixel array.

16. The measurement system according to claim 10, characterized in that the imaging device comprises a plurality of pixels arranged in two dimensions and in that the processing and computing means are designed to compute displacements of the image in two directions defining the imaging device.

17. The measurement system according to claim 10, wherein the light source (1) is a punctual light source of the LED kind.

18. The measurement system according to claim 10, wherein the concave mirror (3) has a spherical or parabolic shape.

19. The measurement system according to claim 10, wherein the optical mask (4) is a grating comprising transparent and opaque areas for shaping the two dimensional regular pattern and the absolute code.

20. The measurement system of claim 19, wherein the transparent areas are made of perforations or holes.

21. The measurement system according to claim 10, wherein the mobile element is a trigger stylus, a touch trigger stylus, a force measurement system or an accelerometer.

\* \* \* \* \*